United States Patent [19]

Goetz

[11] Patent Number: 5,117,374
[45] Date of Patent: May 26, 1992

[54] RECIPROCATING-ELEMENT POSITION ENCODER

[75] Inventor: Howard V. Goetz, Tigard

[73] Assignee: Tektronix, Inc., Beaverton, Oreg.

[21] Appl. No.: 419,302

[22] Filed: Oct. 10, 1989

[51] Int. Cl.⁵ .............................................. G06F 15/20
[52] U.S. Cl. .................................... 364/559; 364/560;
346/75
[58] Field of Search ............... 364/560, 142, 174, 519;
377/18, 17, 8, 107; 400/279; 346/75, 140 R, 1.1

[56] References Cited

U.S. PATENT DOCUMENTS

| | | | |
|---|---|---|---|
| 4,009,332 | 2/1977 | Van Hook | 346/75 |
| 4,179,223 | 12/1979 | Kwan et al. | 40/279 |
| 4,190,845 | 2/1980 | Cooper et al. | 346/75 |
| 4,198,642 | 4/1980 | Gamblin | 346/75 |
| 4,212,553 | 7/1980 | Acosta et al. | 400/279 |
| 4,272,771 | 6/1981 | Furukawa | 346/75 |
| 4,520,368 | 5/1985 | Ims | 346/75 |
| 4,622,560 | 11/1986 | Withoos et al. | 346/1.1 |
| 4,686,540 | 8/1987 | Leslie et al. | 346/140 R |
| 4,775,254 | 10/1988 | Nakao et al. | 400/279 |
| 4,905,015 | 2/1990 | Sieber et al. | 346/140 R |
| 4,920,355 | 4/1990 | Katerburg | 346/75 |
| 4,974,164 | 11/1990 | Lewis et al. | 364/562 |
| 4,978,971 | 12/1990 | Goetz et al. | 346/1.1 |

Primary Examiner—Parshotam S. Lall
Assistant Examiner—Ellis B. Ramirez
Attorney, Agent, or Firm—John D. Winkelman; Edward B. Anderson

[57] ABSTRACT

Print heads are formed with spaced subheads having nozzles such that all of the lines or pixel rows on a print medium such as a sheet of paper are printed by scanning of the print head along the face of the sheet. The head structures include three subheads, each having nozzles for printing one or more adjacent lines with the subheads being spaced the same number of lines apart as the number of lines each prints; and three subheads spaced the equivalent of seven lines apart, each subhead having three nozzles spaced at the equivalent of alternate lines. The heads are advanced between scans by an equivalent number of lines generally equal to the number of nozzles in the head, whereby all print lines are addressed only once. Apparatus for printing includes the use of pointers in registers to keep track of head structure and location on a print medium for calculating print addresses. A partial page memory is used which wraps around to the beginning from the end. A positive printer carriage position encoder uses an index marker located in the middle of a strip of incremental markers. Sensing of the index marker resets an up/down counter with a value that gives a positive value for all count conditions.

7 Claims, 16 Drawing Sheets

RECIPROCATING-ELEMENT POSITION ENCODER

FIELD OF THE INVENTION

This invention relates to a position encoder, and in particular, to such an encoder having an intermediate marker for indexing the position of a reciprocating element.

BACKGROUND OF THE INVENTION

This invention is related to the invention disclosed in copending U.S. patent application having Ser. No. 419,367 of MacLane et al., now abandoned entitled "Method and Apparatus for Interlaced Printing", assigned to the same assignee as the present invention.

The preferred apparatus for and method of practicing the present invention is associated with an ink jet printer wherein a print head scans a print medium, most typically a sheet of paper, by shuttling back and forth across the sheet of paper or by moving continuously along the sheet of paper which is held against a rotating drum. Images are formed by selectively depositing ink deposits or pixels which are located on lines and in columns. The present invention however is equally applicable to any apparatus having an element which reciprocates along a predetermined path relative to a frame or other member.

Inherent in any such printing system is the requirement that the true position of the print head relative to a print medium on which an image is being printed must be known. To deal with this, conventional print-head carriages use incremental encoders, both linear and rotary. These encoders do not give an absolute position output, but instead give relative indications. Thus, some means must be found to establish an absolute reference point for the encoder whenever a system using such an encoder is first turned on or the absolute position is in question.

This is commonly done by using an index marker or flag that signifies the "home" position for the encoder. In the traditional motion-sensing application, a counter is connected to the output of the encoder, and detection of this index marker or flag is used to clear the counter. In the case of a printer using a linear encoder to determine carriage position, the usual method is to have an index marker at the extreme left position of the carriage. This establishes the "0" position of the carriage, and any position to the right of this corresponds to a positive number in the counter.

Printers must also be able to scan over a variety of different media or image widths. It is also desirable to recheck the encoder and connected counters against the reference, or index, marker relatively frequently so that count errors due to electronic noise, errors, and mechanical vibration do not cause cumulative errors. Ideally, the cumulative count should be checked against the zero reference every pass of the carriage.

In the case of a printer whose carriage is programmed to scan over a narrow media near the middle of its travel, the scan will never reach the index position and thus checking of the cumulative position error against the index will never occur unless special "zero" motions of the carriage are programmed.

SUMMARY OF THE INVENTION

An improved home-referencing encoder made according to the present invention provides positive and accurate position sensing of a print head relative to a print medium. The basic concept is the use of a marker or reference flag in a region of travel through which the print head frequently travels. The resultant signal triggered by the position of the print head at the marker presets a counter at a specified value that produces a positive value for the entire print head range of travel.

In general terms, this is provided by an encoder for tracking the position of a first element moveable relative to a second element back and forth along a path having a predetermined maximum length. A multiple-position indicator, fixed relative to the second element, defines a plurality of positions of the first element along the path. A single-position indicator, also fixed relative to the second element intermediate the ends of the path, defines a predetermined position along the path. A first generator responsive to the means defining a plurality of positions generates a first signal indicative of movement of the first element relative to the second element. A second generator responsive to the predetermined position defining means generates a second signal indicative of movement of the first element past the predetermined position relative to the second element. A counter is responsive to the first signal for counting up and down, corresponding to the direction of travel of the first element relative to the second element. Finally, a means responsive to the second signal resets the counter to a predetermined value greater than zero when the first element travels past the predetermined position relative to the second element.

These and other features and advantages of the present invention will become apparent from a reading of the following detailed description of the preferred methods of and apparatus for practicing the invention in association with the accompanying drawings.

DETAILED DESCRIPTION OF THE PREFERRED EMBODIMENTS

Figure 1:
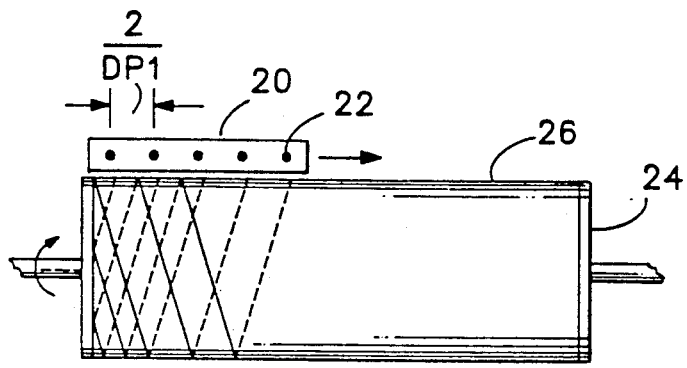
FIG. 1 is a simplified illustration of a conventional drum printer.
Figure 2:
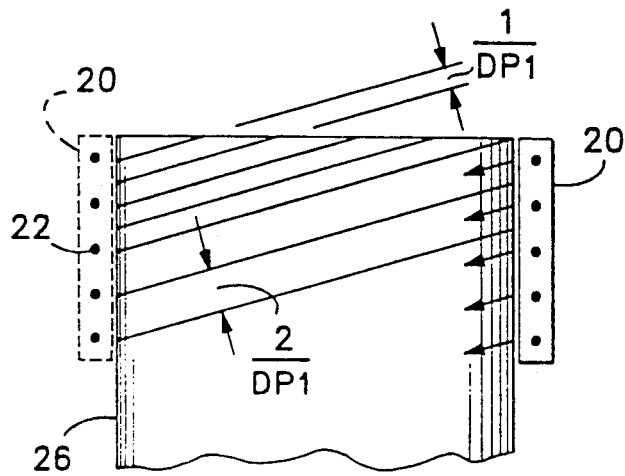
FIG. 2 is a face view of the head and print medium of FIG. 1.
Figure 3:
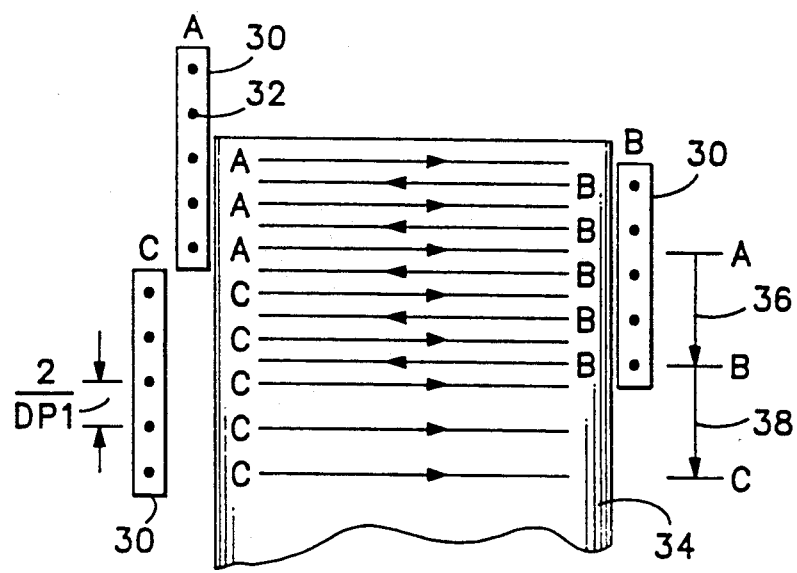
FIG. 3 is a view similar to that of FIG. 2 showing an alternative conventional embodiment.

FIGS. 1-3 disclose conventional printing heads having nozzles spaced a plurality of printed line widths apart with each scan of the head printing lines interlaced with lines printed during the preceding scan.

FIG. 1 shows a simplified design of a printing head 20 having a plurality (five) of nozzles 22 spaced for printing simultaneously a plurality of spaced lines. Head 20 is positioned adjacent a drum 24 having a print medium, such as a sheet of paper 26, mounted on it. As the drum and sheet rotate, the head is moved at a constant velocity longitudinally along the drum so that all lines are printed. During each full revolution, the head advances the equivalent of 5 line spacings. Thus, on each subsequent revolution, the upper lines between lines printed on the prior revolution are printed in addition to new spaced lines, as shown. This head embodiment is also shown in FIG. 3 for printing by scanning back and forth across a planar print medium.

In these figures, one line spacing between the centers of adjacent lines is the inverse of the dot-per-inch density, or 1/DPI, two line spacings is 2/DPI, etc. In FIG. 2, head 20 is shown in dashed lines at the position at the edge of the sheet after completing a series of lines. The head is also shown in solid lines, in the same position on drum 24, ready to begin the next set of lines. It can be seen by the arrows that two lines of the next set of lines are interlaced with the preceding set of lines. All of the preceding lines are printed. Continued drum rotation results in all of the lines on sheet 26 being printed.

A printing system equivalent to that of FIGS. 1 and 2 is shown in FIG. 3. In this embodiment a head 30 with nozzles 32 prints alternate lines on sheet 34. However, rather than sheet 34 being on a drum and rotated, it is moved both longitudinally and laterally relative to head 30. Normally, the head shuttles back and forth across the face of sheet 34 as the sheet is advanced. After each set of lines is printed, head 30 is shifted down the sheet by an amount shown by arrows 36 and 38 which are equal in length to the width of 5 lines of print. Thus, typically head 30 is stopped at the end of each scan pass, the sheet is shifted, and the head is driven across the sheet in a reverse direction.

It can be seen that the embodiment of FIG. 3 provides in effect the same printing operation or method as that of FIGS. 1 and 2. The letters at the top of the respective head positions represent the passes in alphabetical sequence. Corresponding letters are applied to the beginning of lines printed during each pass.

Figure 4:
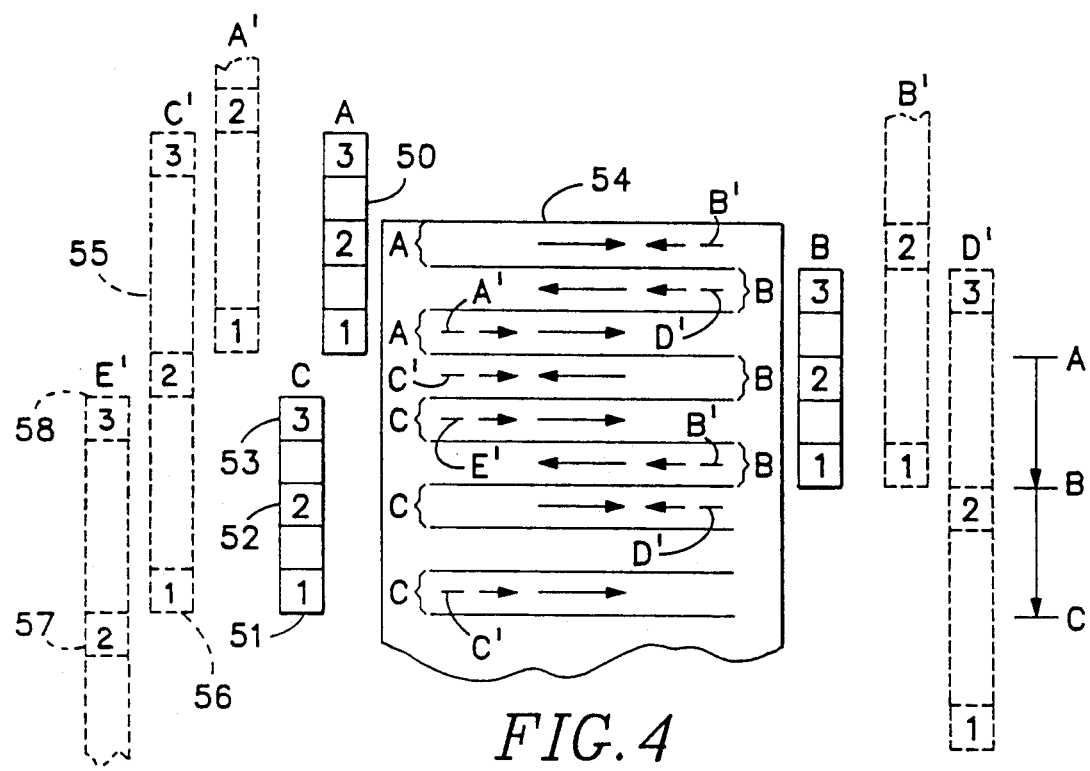
FIG. 4 is a view similar to that of FIG. 3 showing generally a head design providing set interlaced printing.

A preferred embodiment for printing according to the present invention is shown in FIG. 4. A head 50 is formed of subheads 51, 52 and 53 (listed as 1, 2 and 3 in the figure). Each subhead prints a set of adjacent lines represented by the bracketed regions on a sheet 54 of a print medium. Again, the letters designate the alphabetical sequence of scans by head 50 across sheet 54. The solid arrows on the sheet indicate the direction of scan for the corresponding region.

The subheads forming head 50 are spaced apart by the same distance as the region scanned by each subhead. The area of sheet 54 printed by subhead 52 during scan B is adjacent areas printed by subhead 51 during scan A and by subhead 53 during scan C to completely fill in the overall area. The head is advanced the equivalent of three subhead regions, between scans.

A second embodiment of the subhead structure is illustrated by head 55 shown in dashed outline, including subheads 56, 57 and 58. The subheads print the same region width as the subheads of head 50. However, these subheads are the equivalent of four subhead widths apart. The corresponding scans are represented by the alphabet labels with a prime, such as A', and the scans are represented by arrows formed with dashed lines within each scan region. Even though the subheads are spaced farther apart, the head advances the same incremental distance relative to the sheet between scans.

Figure 5:
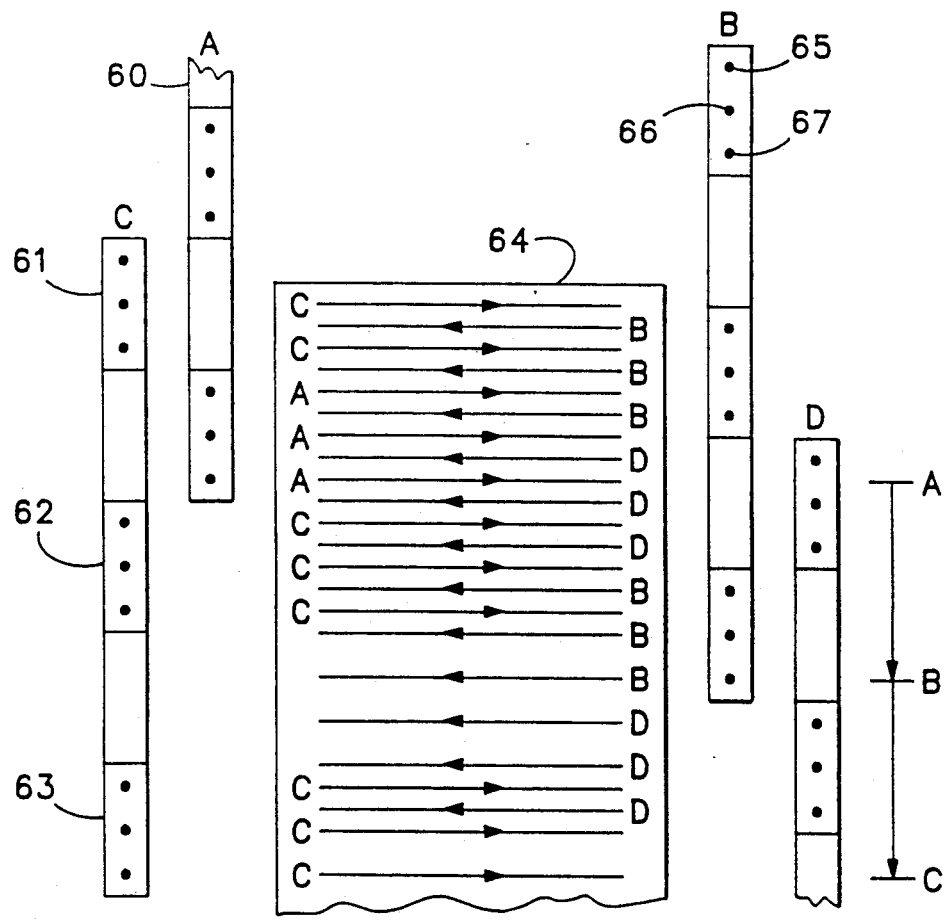
FIG. 5 is a view similar to that of FIG. 4 showing a head design providing interlaced printing of lines within spaced sets of lines.

Printing incorporating interlaced line printing in the interwoven band or set printing of FIG. 4 is shown in FIG. 5. A head 60 formed of subheads 61, 62 and 63 is scanned over a sheet 64 of print medium. Each subhead has a series of three nozzles 65, 66 and 67 spaced the equivalent of two lines apart. The subheads are spaced the equivalent of seven lines apart. The head is advanced the equivalent of nine lines between scans, the same distance as the number of nozzles in the head.

Figure 6:
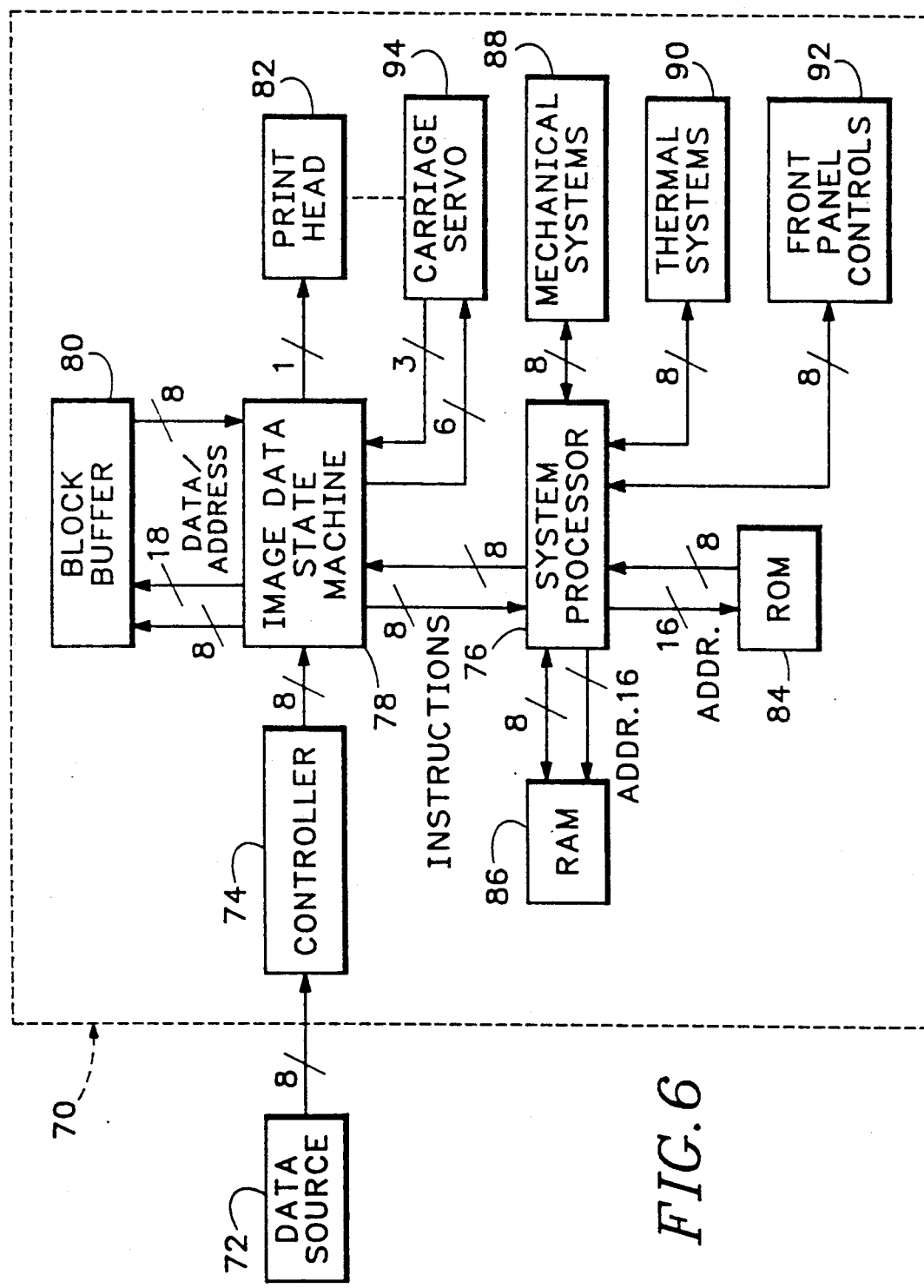
FIG. 6 is a general block diagram illustrating an apparatus made according to the present invention for printing as illustrated in the previous figures.

FIG. 6 is a block diagram of a printer 70 usable to perform the printing described with reference to FIGS. 4 and 5. Printer 70 receives data from a data source 72 at a controller 74. This controller acts as a communication interface with the data source.

From controller 74, the data is input into an image data state machine 78 which writes the data by sequential address in a block buffer (RAM) 80, also referred to as a partial page memory. The incoming data is conventionally in a raster-scan format. It is read out of buffer 80 for printing by a print head 82 in a sequence corresponding to the physical configuration of the print head array.

System processor 76 provides overall control of printer 70. It typically includes an operating program stored in a ROM 84 and retrievably stores information being processed in a RAM 86. The system processor receives dynamic information from the printer mechanical systems 88, thermal systems 90 and front panel controls 92. State machine 78 also exchanges positional information with a print head carriage servo 94 for coordinating data reading with print head position relative to a print medium.

Figure 7:
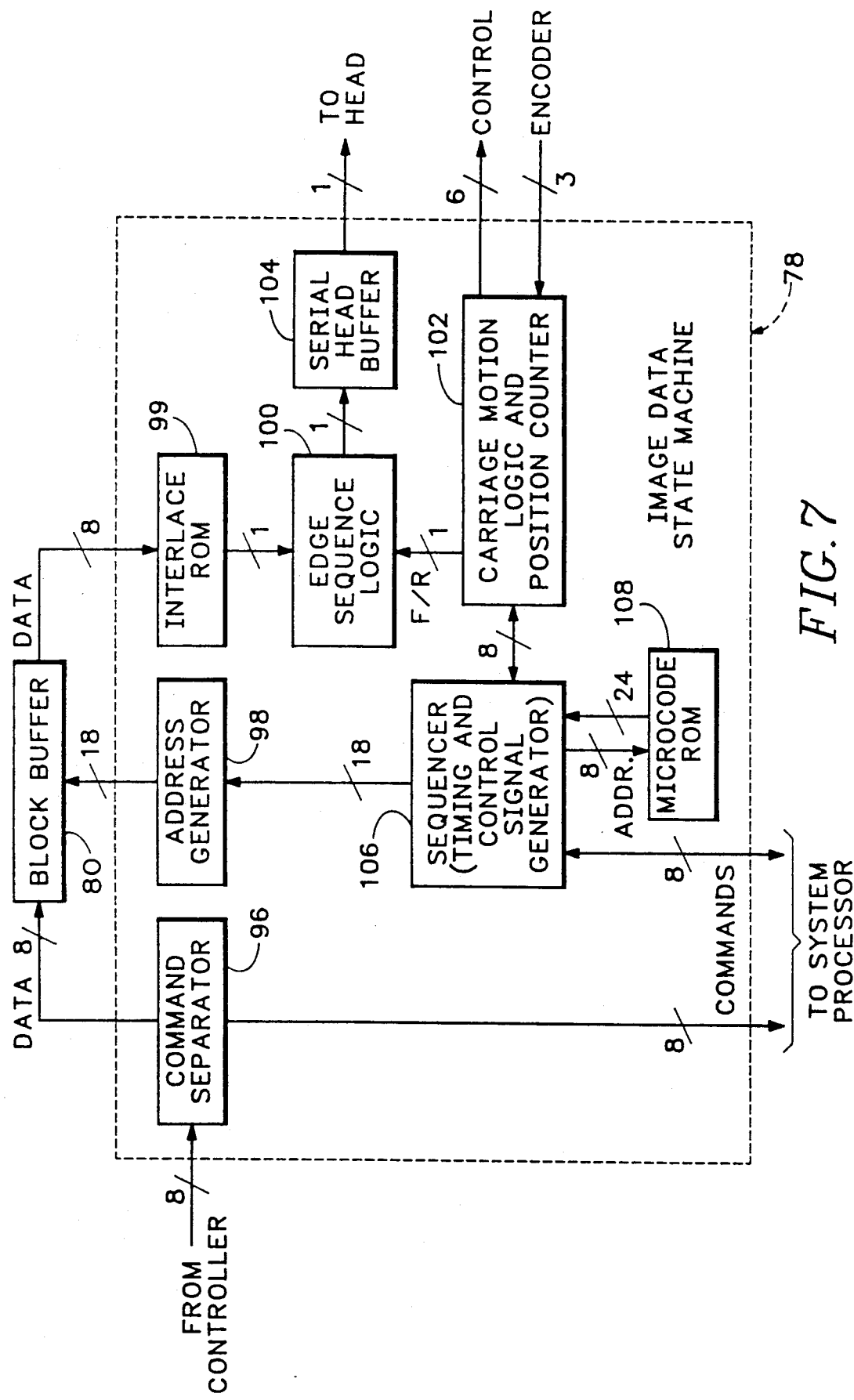
FIG. 7 is a more detailed block diagram of the image data state machine shown in FIG. 6.

FIG. 7 shows in further detail the structure of state machine 78 which controls writing and reading of pixel data. The information is received in a command separator 96 from controller 74. The command separator identifies the information as either data or system commands. The commands are routed to system processor 76. The data is fed into and out of block buffer 80 at addresses determined by an address generator 98. The data is read out into an interlace ROM 99 which functions, using a look-up table, to select the appropriate bit from each stored 8-bit data word to be used to control whether each jet will print. In special circumstances, the interlace ROM can be replaced by combination logic using the same inputs and outputs.

The eight bits of data coming from the block buffer contain two 4-bit pixels, each of which has 1 bit for each of the primary colors black, cyan, magenta and yellow. The eight bits of input to ROM 99 consist of seven bits of jet number, one bit of read address, and a mode selection. The seven bits of jet number select which of the four color bits are routed to the one-bit serial output.

Printer nozzle print suppression, which provides printing only on the image region of a print medium, is controlled through an edge sequence logic circuit 100 receiving position and direction (forward/reverse) signals from a position counter circuit 102. This circuit sends control information to the carriage servo circuit and receives position information from an encoder attached to the carriage.

This 1-bit data path continues through the edge sequence logic to a serial head buffer 104. This buffer functions as temporary storage of the 98-bit serial data stream coming from logic circuit 100 prior to sending it to the head.

A sequencer 106, also referred to as a timing and control signal generator, responds to supervisory commands from the system processor under the direction of a microcode stored in a ROM 108. The sequencer controls the generation of read and write addresses in address generator 98 to provide the data reformatting necessary to send the corresponding pixel data to the print head. This is coordinated with the print head carriage position provided through carriage motion logic and position counter circuit 102.

Figure 8:
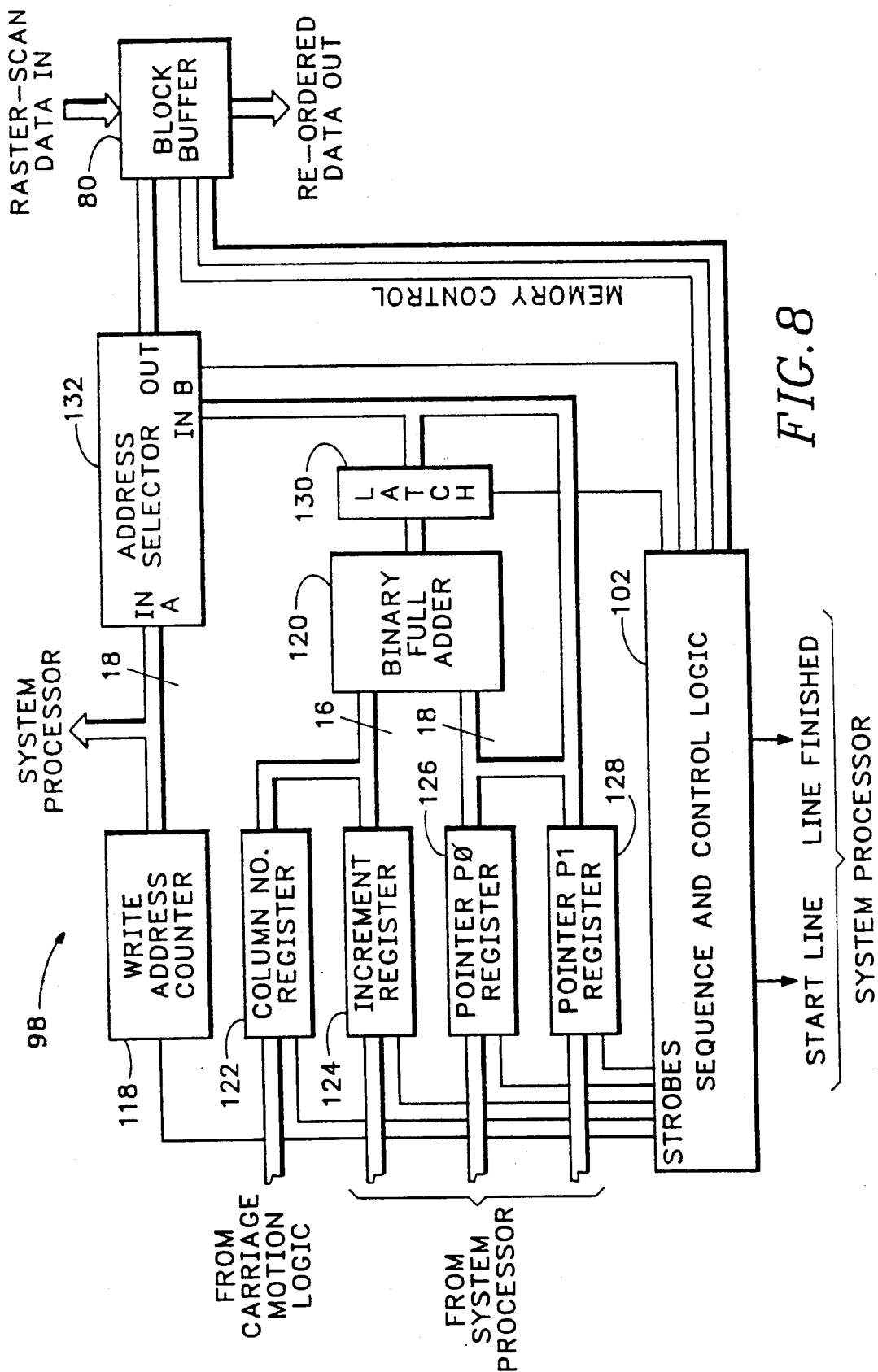
FIG. 8 is a schematic of the address generator and sequencer of FIG. 7.
Figure 9A:
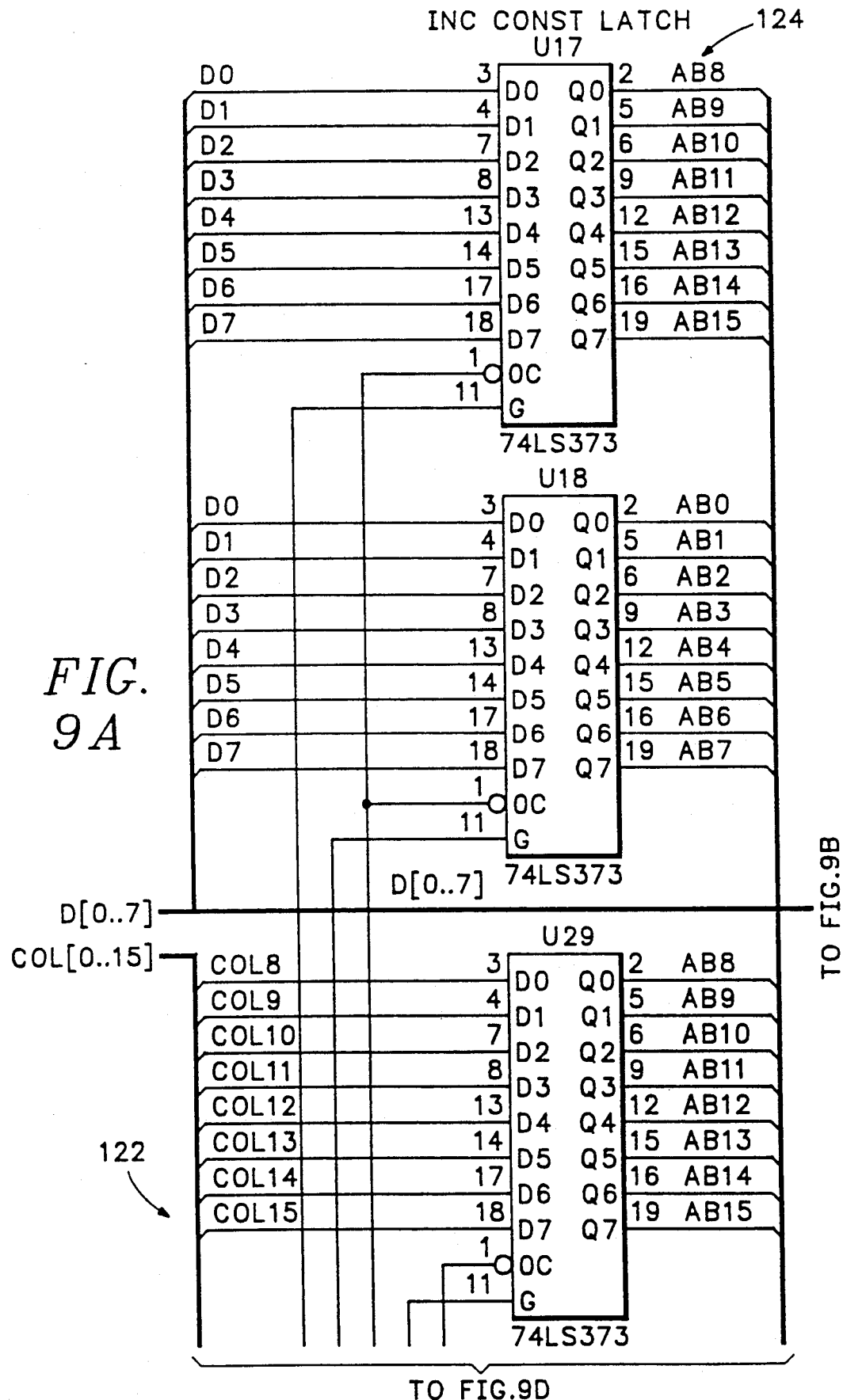
FIGS. 9A-9F form a circuit schematic corresponding to the apparatus of FIG. 8.
Figure 9B:
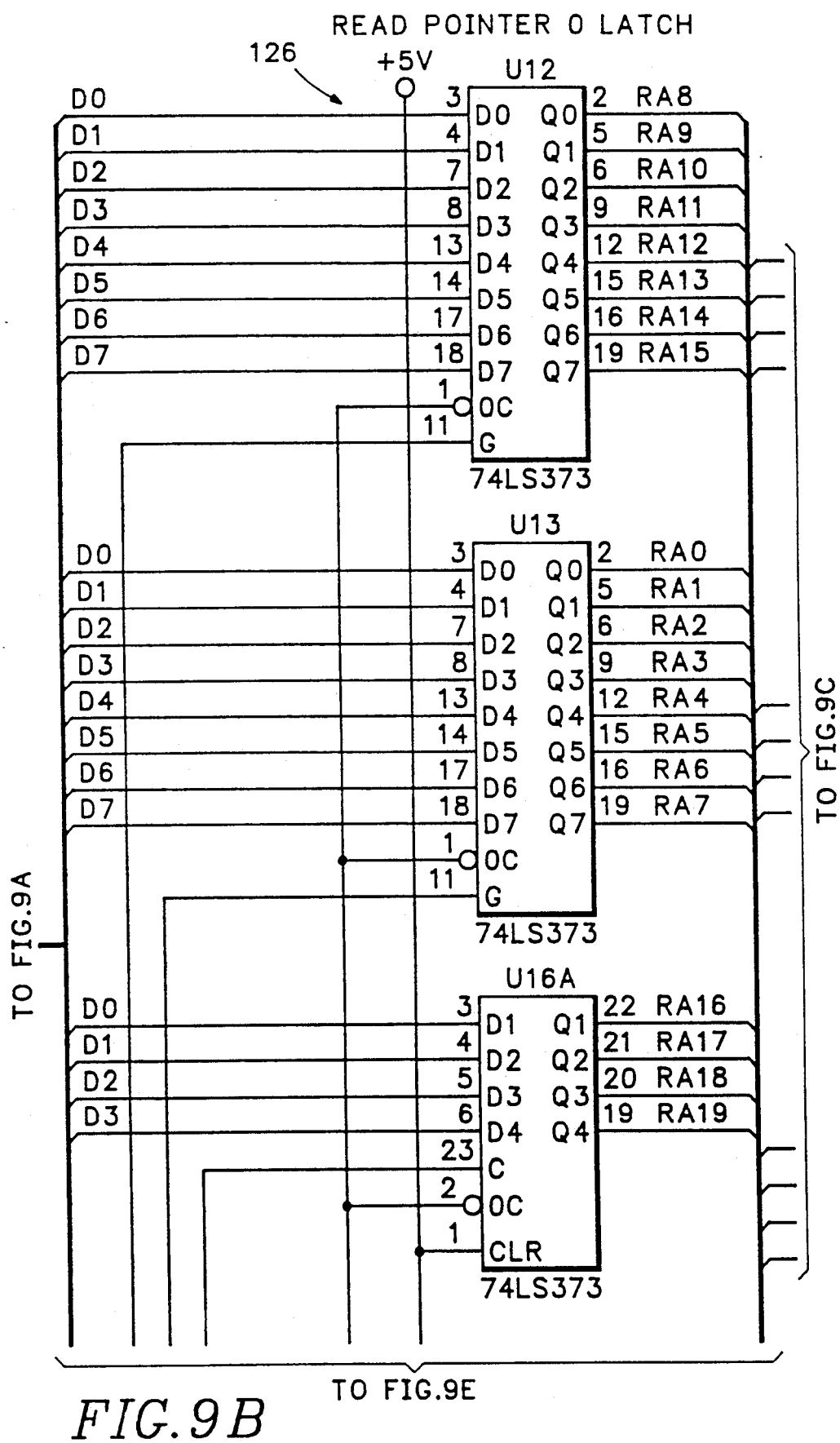
Figure 9C:
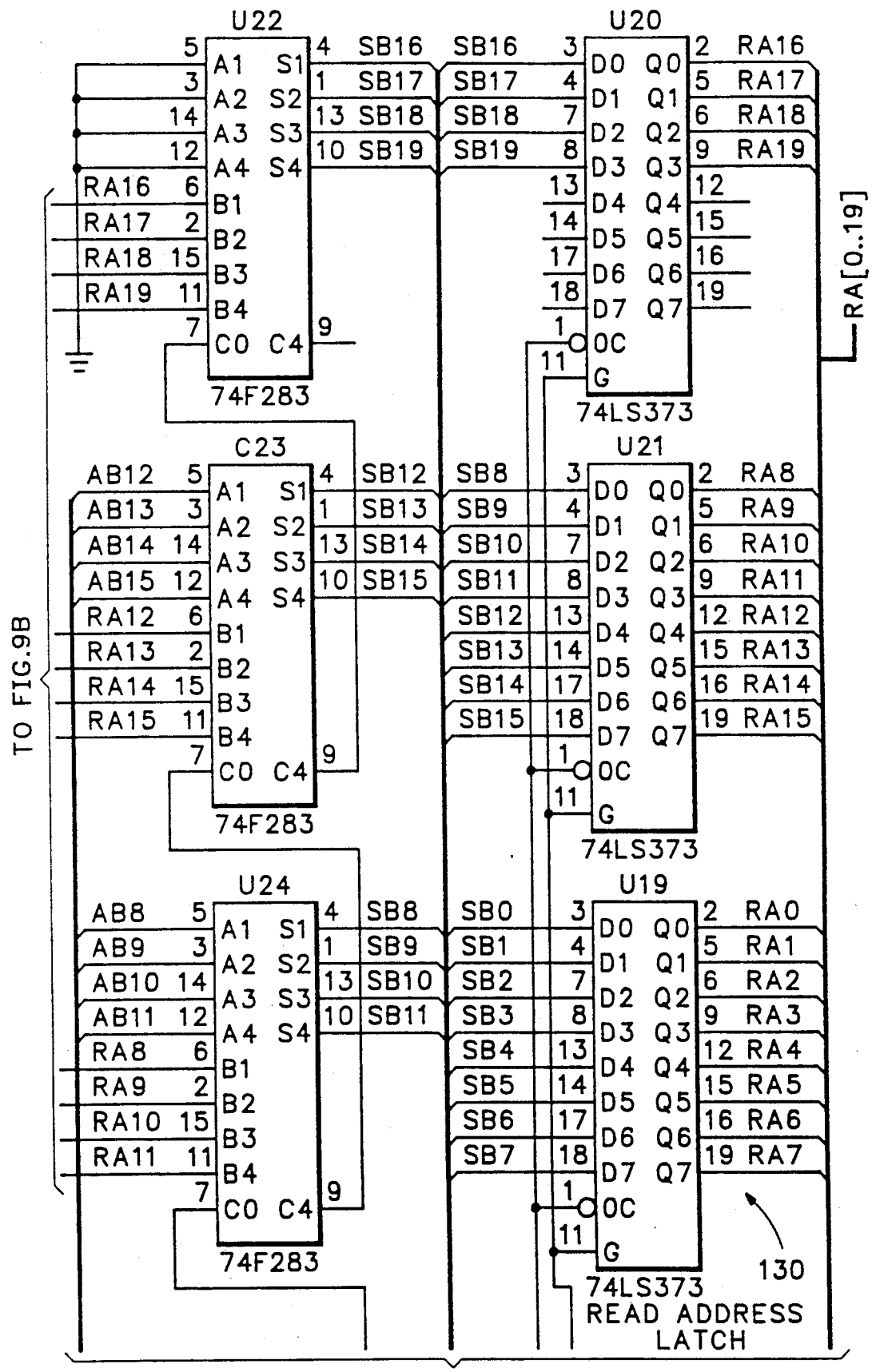
Figure 9D:
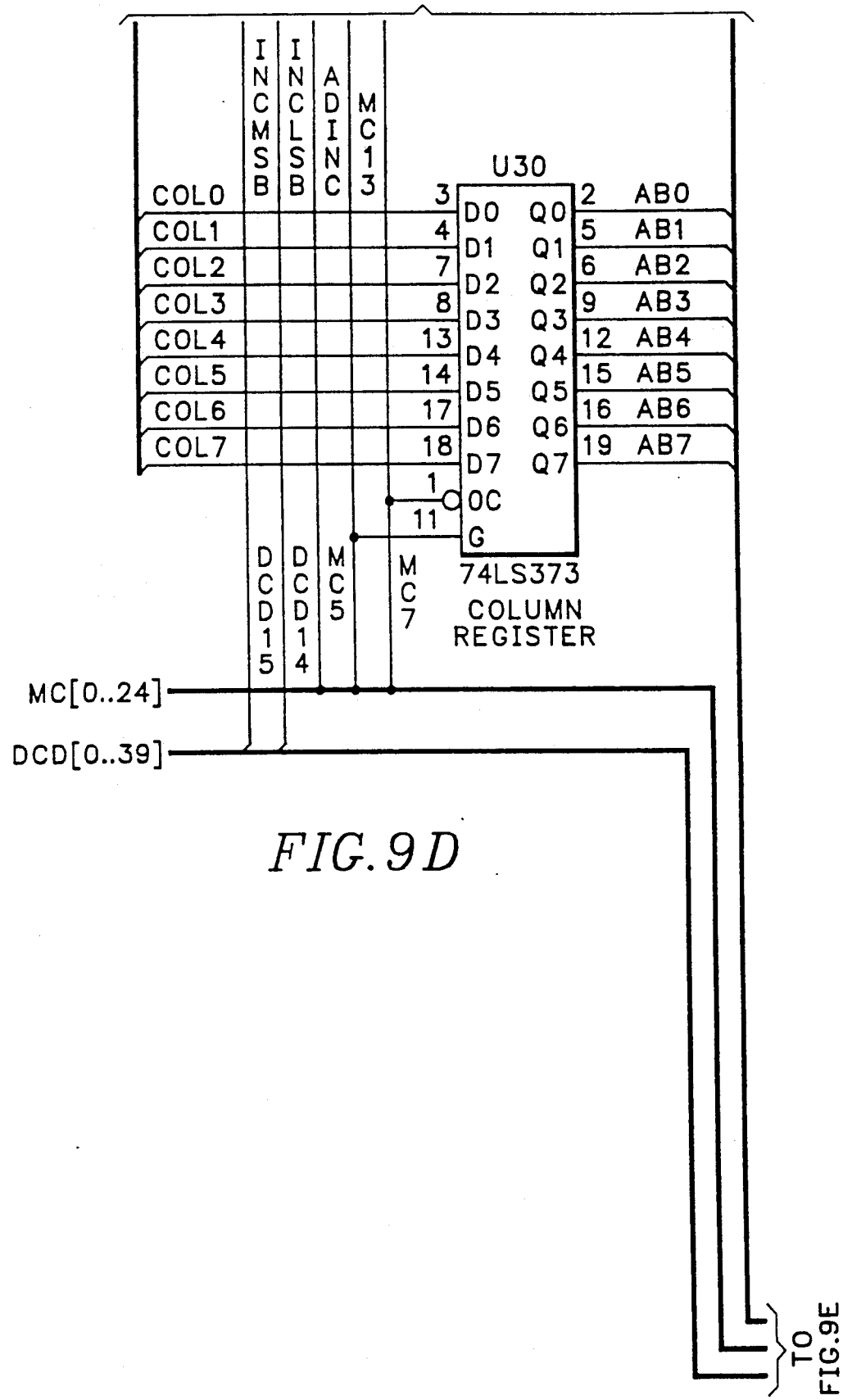
Figure 9E:
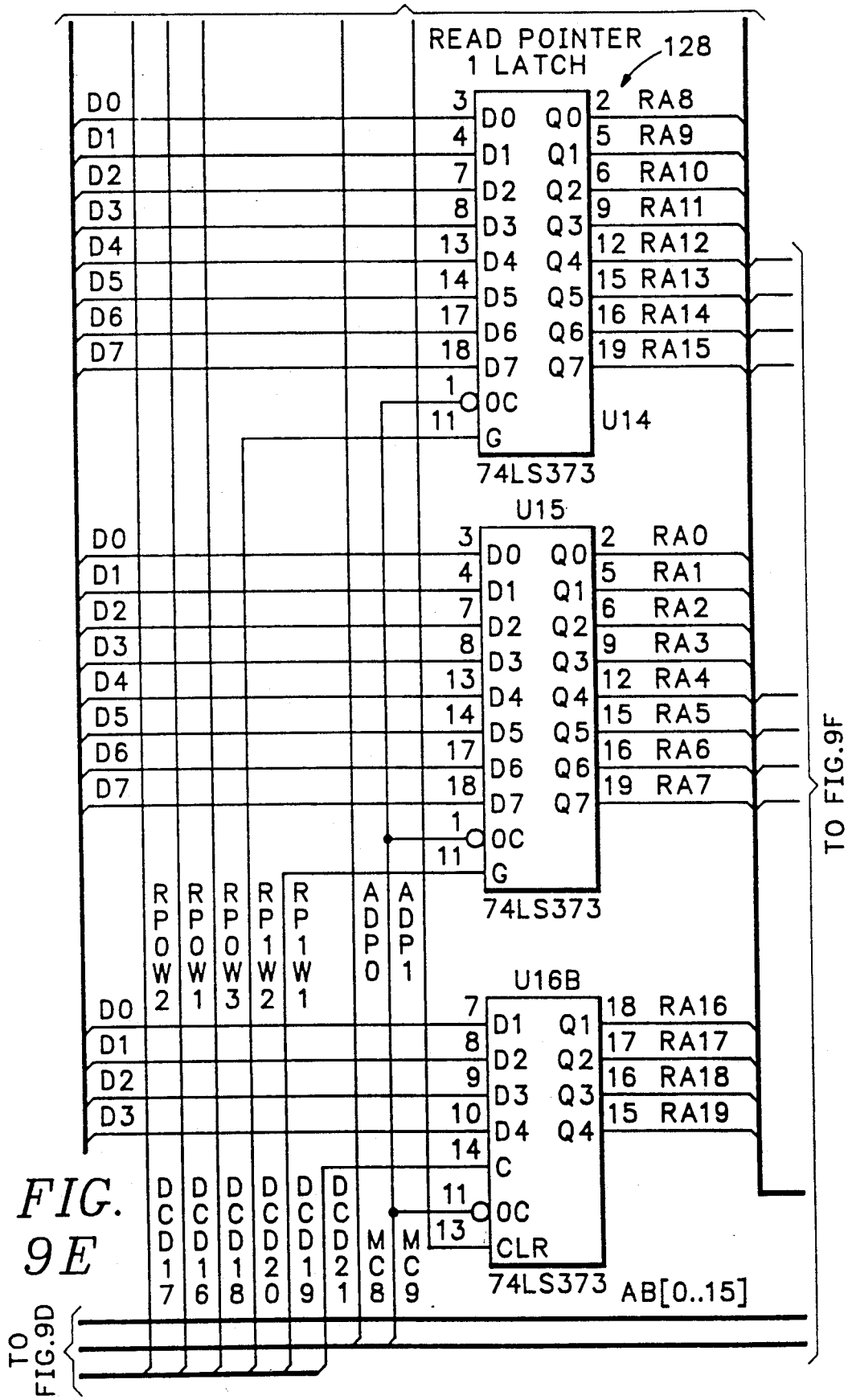
Figure 9F:
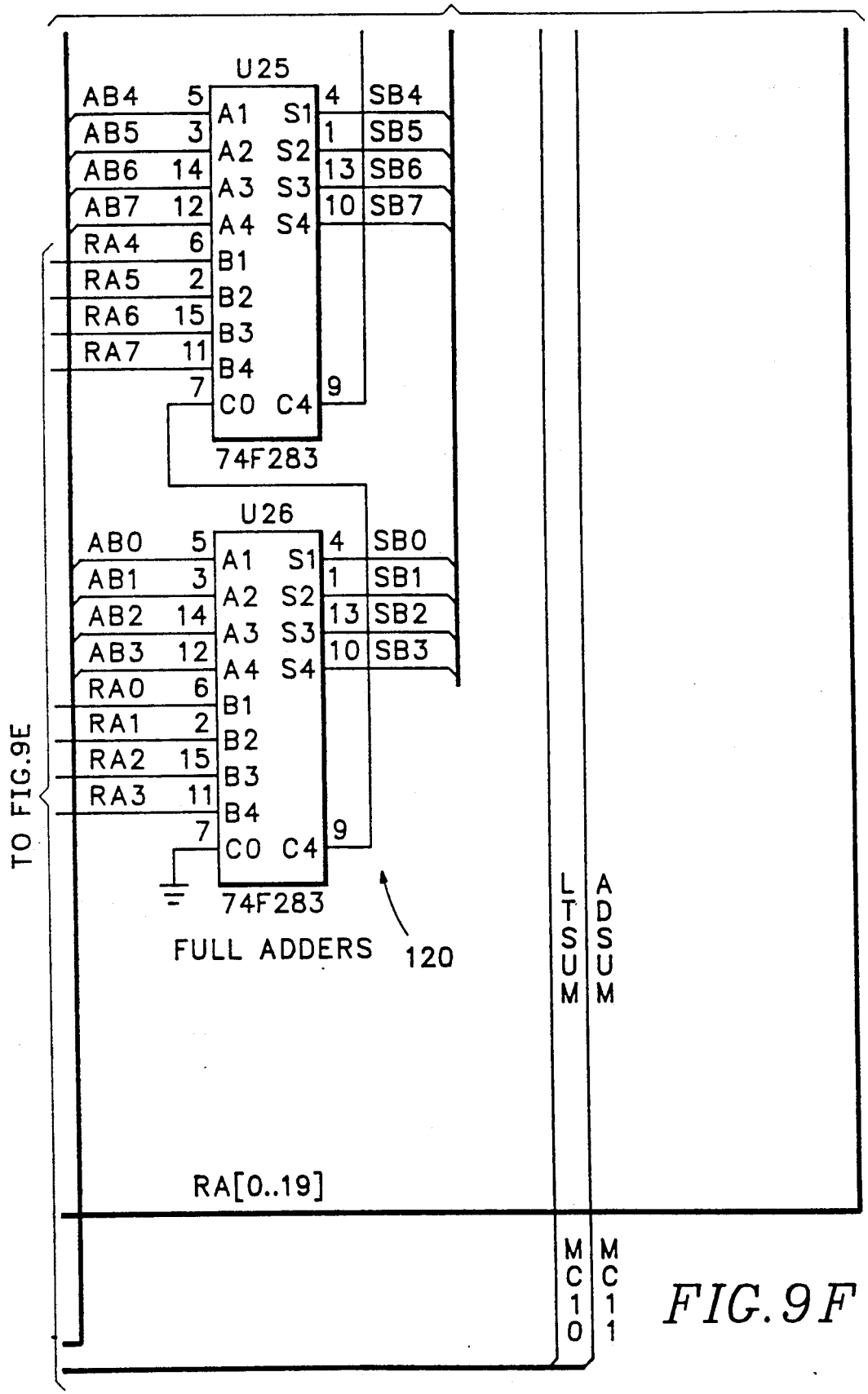
Figure 10:
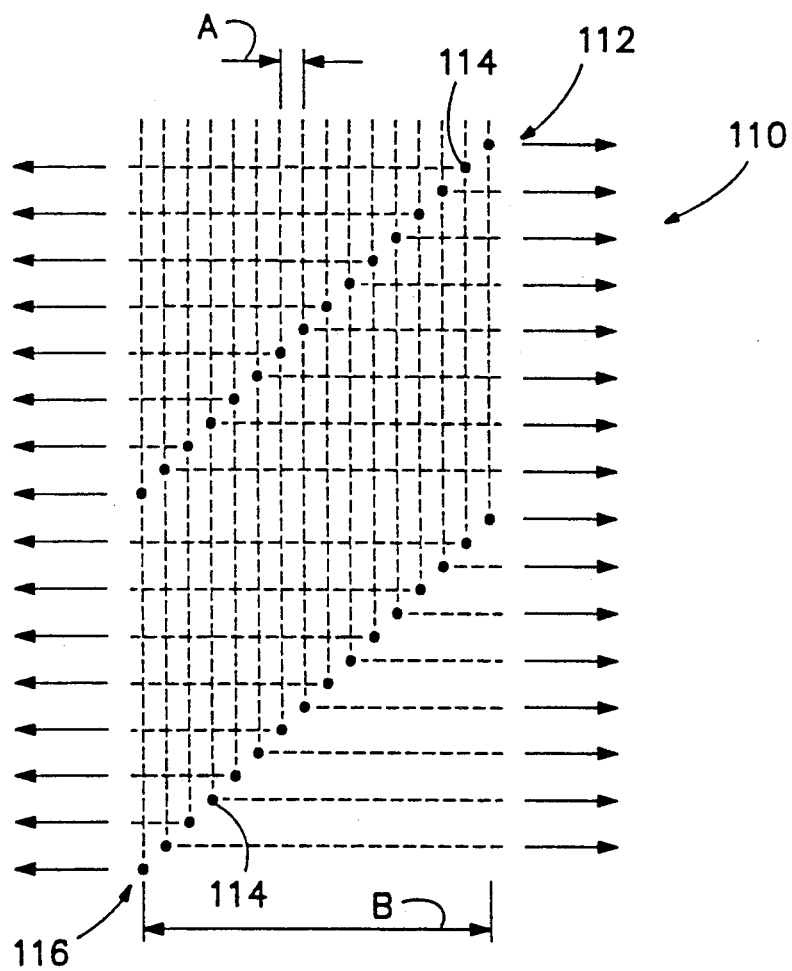
FIG. 10 is a further diagram of a specific ink-jet head array usable with the apparatus of FIG. 6.

FIG. 8 shows in further detail the structure of address generator 98, with a portion of the specific circuit schematic shown in FIGS. 9A and 9B. This embodiment is designed to control printing of a head nozzle array 110 shown in FIG. 10. Array 110 includes a first set 112 of nozzles 114 wherein each nozzle within the set is offset from each adjacent nozzle a horizontal distance A and a vertical distance of the width of one line. A second set 116 has the same number of nozzles 114 and same relative positioning of nozzles within the set. However, the top nozzle of the second set is offset from the bottom nozzle of the first set by a horizontal distance B (in pixel spacings or addresses) and a vertical distance of one line. The address offset of the top nozzle of the second set is thus equal to the total number of pixel locations in a line − B from the last nozzle of the first set.

In the actual embodiment, the distance A is equal to the width of ten pixels (or pixel locations). If a line contains 3000 pixels, then each nozzle is 2990 pixel locations sequentially from the next preceding pixel location within the set. The preferred head also prints with alternate nozzles when the head scans one direction and with the remaining nozzles when the head scans the other direction. Thus, it is only necessary to move the actual head relative to the print sheet on alternate scans. However, the addressing of printing heads in any scan direction then accommodates this increase in the effective spacing of the heads. The set interlaced printing illustrated in FIGS. 4 and 5 is provided by increasing the spacing between sets 112 and 114. Also, in the actual embodiment, each set contains 48 nozzles, and the two sets are spaced horizontally from each other rather than vertically, as shown. This embodiment is useful for providing a capability of both black (one subhead) and color (the other subhead) printing. Within the color subhead, three basic colors, such as the three subtractive printing colors of cyan, magenta and yellow, can be provided by multiple sets of three consecutive nozzles within the subhead or by three blocks of nozzles within the subhead. This then is a form of interlaced printing.

Printer 70 can accommodate either design. With little modification, it will be seen that other designs can also be accommodated. For instance, the designs of FIGS. 4 and 5 are accommodated by adjusting both the increment value within a subhead, and the offset between subheads.

Incoming raster-scan format data is written into block buffer 80. The addresses that govern the memory locations that the incoming data is written into are generated by a simple write address up-counter 118 that is incremented each time that a data byte is written into memory. Thus the pixel data is written into the memory starting at location 0 in the same order in which it comes in from the controller or data source. The system processor can at any time read the current value of the address counter to determine how much data is stored in the memory.

When the block buffer memory contains enough data to allow printing to begin, the data reformatting process begins. From this point on the reformatting process and memory access are under control of the sequence and control logic of sequencer 106. This control is provided by the microprogram stored in ROM 108.

Reformatting the pixel data is accomplished by computing the addresses from which the pixel data is to be read in a particular order, different from the sequential order in which the data was written. This address calculation is performed by a binary full adder 120 using numbers from a column number register 122, an increment register 124, a pointer P0 register 126, and a pointer P1 register 128 in combination with the previous calculated address, stored in a latch 130. An address selector 132 selects between the address in write address counter 118 and latch 130, depending on whether data is being written into or read out of block buffer 80.

The column number register stores a number provided by logic circuit 102 which controls the print head position, and is defined as the number of the pixel location (column) in from the left edge of the image that lies under the right-most nozzle of the first set of nozzles of the print head. The numbers in the other three registers are calculated and stored by the system processor. The number in the increment register remains constant for the entire image, and is related to the image width and print head design. For the particular print head mention previously, it is equal to the image width (in pixel locations) − A. In the embodiment described above, it is 3000 pixel locations − 10, or 2990. In the embodiment shown in FIG. 10 where A is equal to the width of one pixel location, the increment value is 2999 if all nozzles are used.

The numbers in the pointer registers are used to relate the current read address to the address at which the data was originally written. When the first printing position of the print head is established for the current pass in an image printing operation, the number in pointer P0 register is the memory address of the first pixel location in the top line of the portion of the image to be printed. For a split head array as actually used in this embodiment having vertically spaced nozzle sets, the value in the pointer P1 register corresponds to the value in the P0 register minus the horizontal offset B, which is the offset between the two rows of jets in the print head. For the head array shown in FIG. 10, the value in the pointer P1 register corresponds to the line length in pixel locations plus the offset B.

Figure 11A:
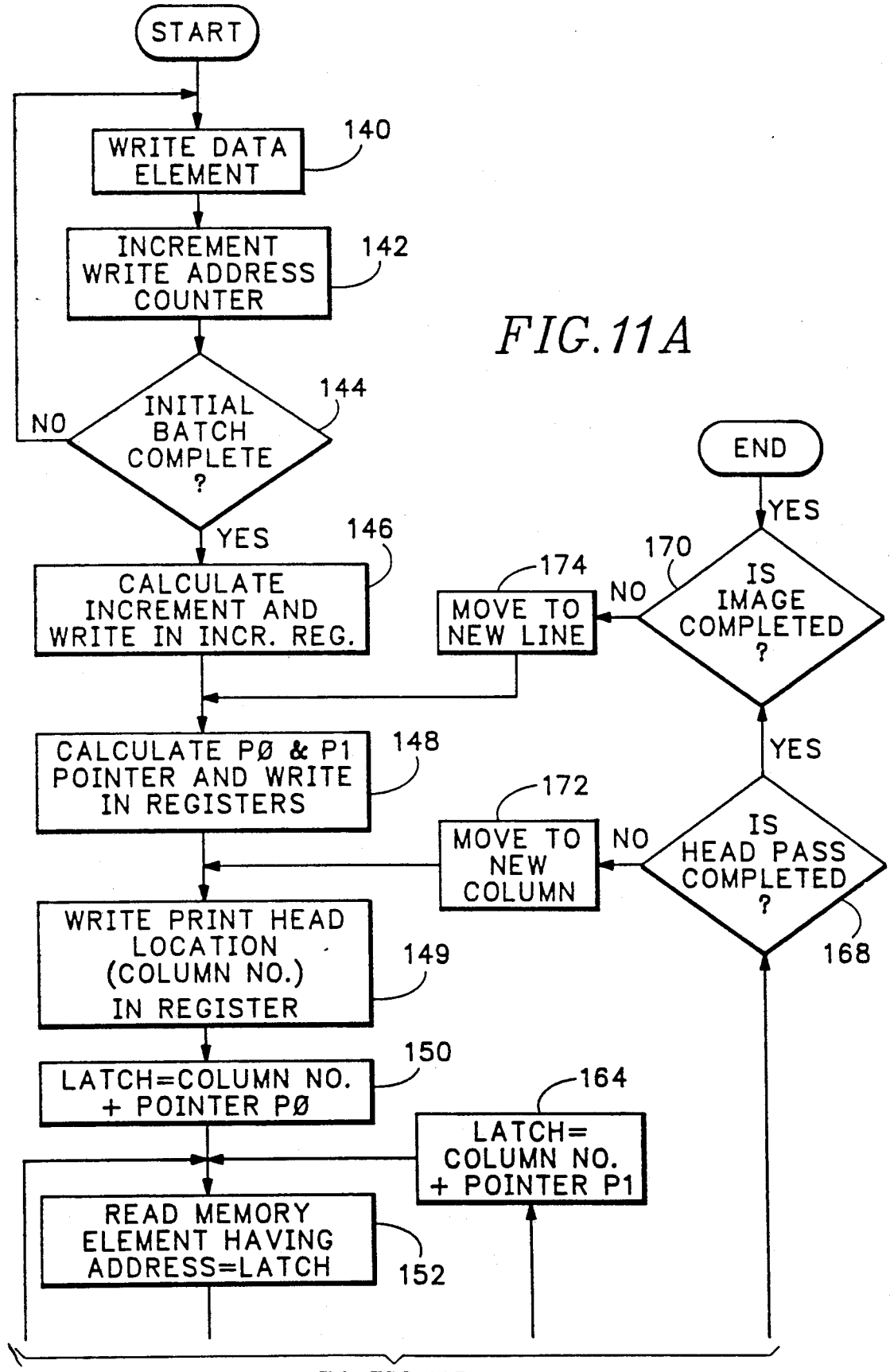
FIGS. 11A and 11B are flow charts illustrating the data reformatting operation of the apparatus of FIG. 6.
Figure 11B:
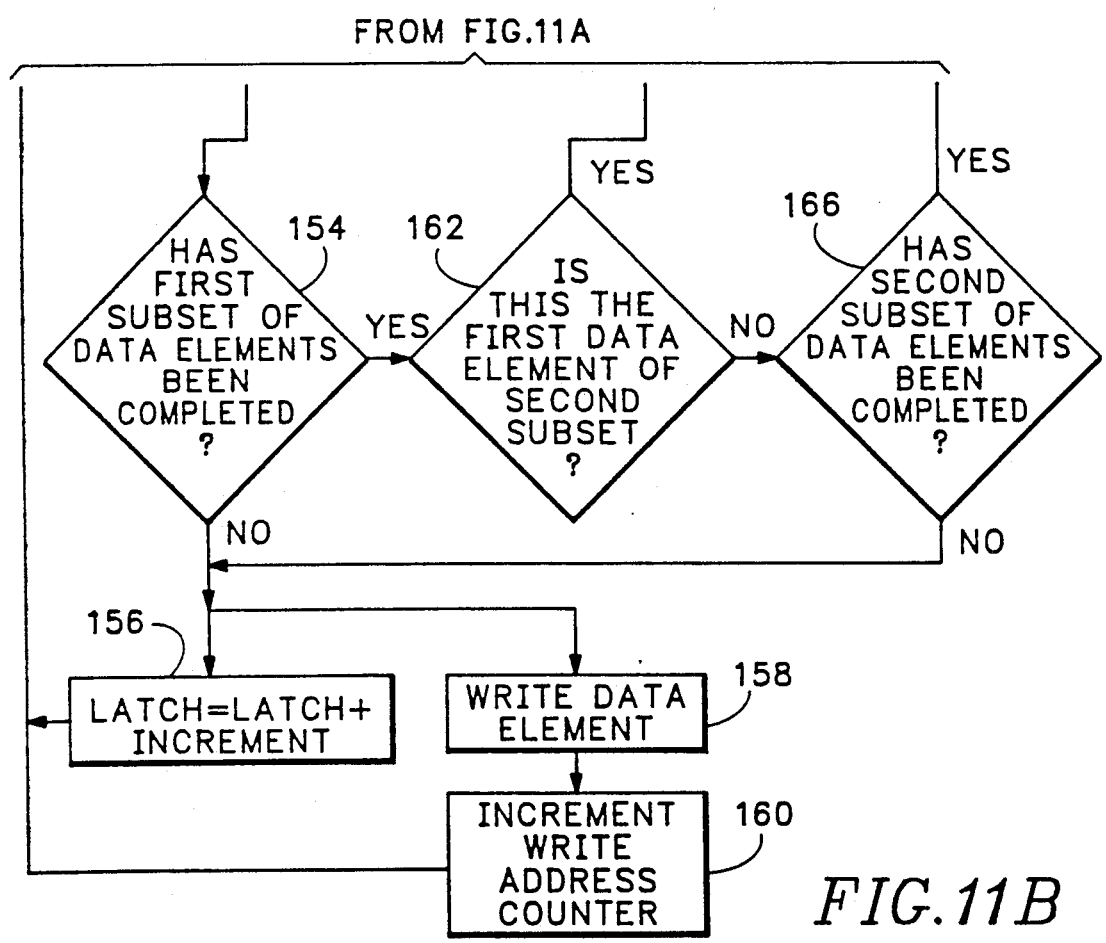

FIG. 11 is a flow chart showing the various steps in printing an image. Incoming data elements are written at block 140. The write address counter is incremented at block 142 and a decision is made at decision block 144 on whether enough data is written to begin printing. If not, then another incoming data element is written at the last incremented address.

If the initial batch of data is written into memory, the increment A is calculated and written into the increment register at block 146. The values for pointers P0 and P1 are calculated and entered into the corresponding registers at block 148. The print head location, as a column number, is entered into the column number register. An initial read address is entered into latch 130 which is equal to the sum of the column number and pointer P0 registers at block 150. The memory element having this address is read from memory at block 152.

If the first set of data elements, as determined at decision block 154, has not been read, then the new read address in latch 130 is set equal to the prior address plus the increment value, at block 156. Concurrent with this process, another incoming data element, if available, is written into memory and the write address counter incremented at blocks 158 and 160. The newly addressed memory data element is then read at block 152 and a determination made again whether the first set of pixel data elements has been read.

If so, a determination is made at decision block 162 as to whether this next data element to be read is the first data element of the second set. If it is, then the address in latch 130 is set equal to the column number plus the value of pointer P1 register, for the actual head embodiment having two vertically spaced nozzle sets. For the embodiment of FIG. 10, the latch is set equal to its prior value plus the offset of pointer P1. The data element at this memory location is then read and the address values incremented and read as with the first set of data elements until the end of the second set is reached. This determination is made at decision block 166.

Once the end of the second set of nozzle positions is reached, a determination as to whether the current pass of the print head is complete is made at block 168. If so, and the image has not been completed, as determined at block 170, then the print head is moved to a new column for the current pass at block 172. The new column number is written in register 122 at block 149 and the process continued until the had pass is completed.

At the end of each head pass a determination is made at block 170 to determine if the image is complete. If not, the head is moved to position for a new set of lines and a new pass at a block 174. The steps previously outlined beginning with setting the P0 and P1 pointers at block 148 is continued until the image is completed, at which point the printing process is terminated.

The design of the memory array, referred to as block buffer 80, used with the above pixel reformatting logic poses some special challenges. It was not considered desirable to make the memory array large enough to store an entire image at one time, due to the very large size and consequent high cost of such a memory. It was therefore necessary to find a way to use a smaller and partial-page memory for temporary storage during the pixel reformatting process. The reformatting must be accomplished without losing the relationship between the write and read addresses, and without complicating the algorithm used to handle the pixel reformatting.

Memory 80 has a size which is less than enough to print an entire page or image. When sufficient data has been entered to fill the memory, it wraps around from the end back to the beginning, together with dynamic read and write pointers. The wrap-around feature of the memory is achieved by generating the write addresses with a simple up-counter that is matched in length to the memory length. For example, if the memory is structured as 256K of 8-bit words, the associated write counter is configured to overflow at a count of 256K (262144). Thus, when the last byte of memory is written, the next byte to be written will be at address 0.

To use a memory such as this, it is necessary to keep track of the pointers. Memory addresses have significance only with respect to these pointers. In other words, data is written at locations starting with or relative to a write pointer, and data is read at locations related to or starting with a read pointer. Keeping the correct relationship between the read and written data thus reduces to a problem of keeping the two pointers the correct number of address locations apart in memory. In the preferred embodiment described, this is done by the system processor. The read pointer starts at location 0. External logic allows data to be written to the memory and the write pointer counter 118 is incremented as described with reference to FIG. 11, until the write pointer is a set number of pixel data elements beyond the read pointer. In the preferred embodiment, this set number is 50 lines times the such as 3000 pixel locations. Since the print head prints on 48 consecutive lines, this assures enough data elements for a complete pass. This is the value of the initial batch of data elements read into memory as described in the flow chart of FIG. 11.

During the reading and printing cycle, enough new data bytes are written to memory to allow the next head pass also to take place. At the end of the current pass, the system processor checks the value of the write pointer, inputting additional data as required, so that it is again at least the same set distance ahead of the read pointer. Thus, pixel data is always decoded with respect to the read pointer stored in the pointer P0 register 126, and the pixel reformatting logic need not be concerned with absolute memory addresses at all.

By using this partial page memory concept, the minimum size for a memory is much reduced from that for a full page. The minimum size for the memory becomes approximately two times the number of addresses between the read and write pointer. Since two pixel data elements can be stored at each 8-bit address location, this is equivalent to 300K of storage elements, or 150K of memory. Thus, the 256K memory is ample to accommodate this method.

A key requirement for the proper operation of the memory as described is that any logic devices or software operations that can affect the memory address must be arranged so as to overflow all at the same value. Thus, if the memory consists of 256K words, the memory address counter, the binary full-adder 120, and the software algorithms that compute
read pointers must all be designed so as to overflow to 0 when the count reaches 256K.

Figure 12:
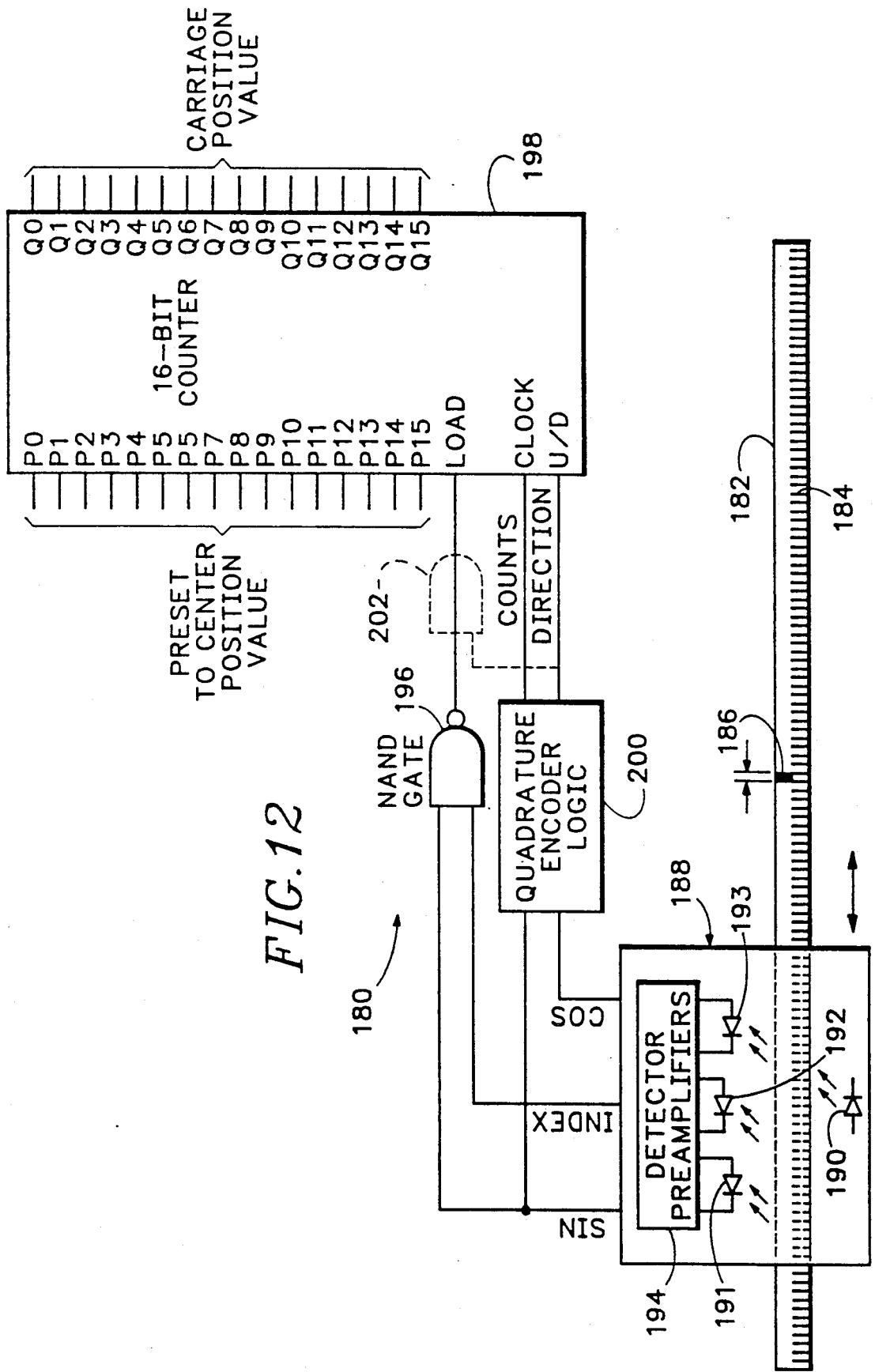
FIG. 12 is a diagram illustrating structure of a invention and included in the apparatus of FIG. 6.

FIG. 12 illustrates the structure of an encoder 180 made according to the invention. The encoder includes a linear relative position strip 182 having a plurality of incrementally spaced markers 184 positioned along it. Strip 182 is long enough to more than cover the maximum width that a print medium image will have. Strip 182 is attached to a frame which stays fixed relative to the print medium.

An index marker 186 or flag is preferably positioned centrally of the strip to identify this fixed position on the strip. This index marker is used to calibrate the carriage position sensing system, as described in the Summary of the Invention in order to correct for any errors in position sensing due to mechanical vibration or electronic noise, and to assure that these variances are not cumulative.

A position marker sensing unit 188 is fixed relative to the print head on the printer carriage and travels along strip 182 so that markers 184 and 186 are sensed. Included is a light emitting diode 190 and corresponding photodiodes 191, 192 and 193. Diodes 191 and 193 are positioned to sense the incremental markers 184 in such a way that they produce signals that are 90° out of phase. Diode 191 is shown to produce a sine wave signal relative to the cosine wave signal of diode 193. Diode 192 senses the occurrence of index marker 186 in a way that is synchronous with the sine wave signal generated by diode 191.

The photodiode signals pass through appropriate amplifiers 194. The sine wave and index signals pass through a NAND gate 196 and the resultant signal is input into the load port of a 16-bit counter 198. The counter has the 16 bits of input preset to a position value that represents the position of index marker 186. The two cosine and sine wave signals also pass through a quadrature encoder logic circuit 200 to obtain a signal identifying the occurrences of markers 184, which is input into the clock port of counter 198. A second signal indicative of the direction of the carriage is fed into the up/down count control port of the counter, so that the count in the counter changes in a manner consistent with the direction of travel of the carriage.

In operation, when the marker sensing unit moves past the index marker, a "high" signal is generated at the "index" output. Because the width of the index mark is equal to the width of the incremental marker spacing, it overlaps two adjacent output clock transitions. By including the NAND gate as shown, only one of these clocks is selected and is sent to the counter. Because of the nature of the 16-bit counter, the data present at the "preset" inputs of the counter will be preset into the counter and will appear at its output on the next rising edge of the clock after the load input goes low. The number present at the preset inputs of the counter can be chosen so that any possible position of the carriage corresponds to a positive count position greater than 0. This greatly simplifies the position control system.

Once the carriage has passed the index marker causing the counter to be preset, it can move forward and back as desired, and the outputs of the counter count up and down accordingly. In the absence of noise, interference, etc., the next time the counter moves past the index marker the value in the counter outputs equals the value that gets preset by the marker, resulting in no net effect caused by the presence of the marker. However, if the counter has accumulated any net position errors for any reason, these errors are removed and the counter again preset to the proper value upon passing the index marker.

As shown in FIG. 12, index marker 186 is preferably located in the middle of strip 182 which represents the middle of travel of the carriage between the sides of images to be printed. Thus, regardless how narrow an image is printed, so long as it is printed at least at the center of the page of print medium, the index marker will be sensed with every scan of the carriage. Certainly other positions would produce the same result, depending on the minimum image width printed.

Figure 13:
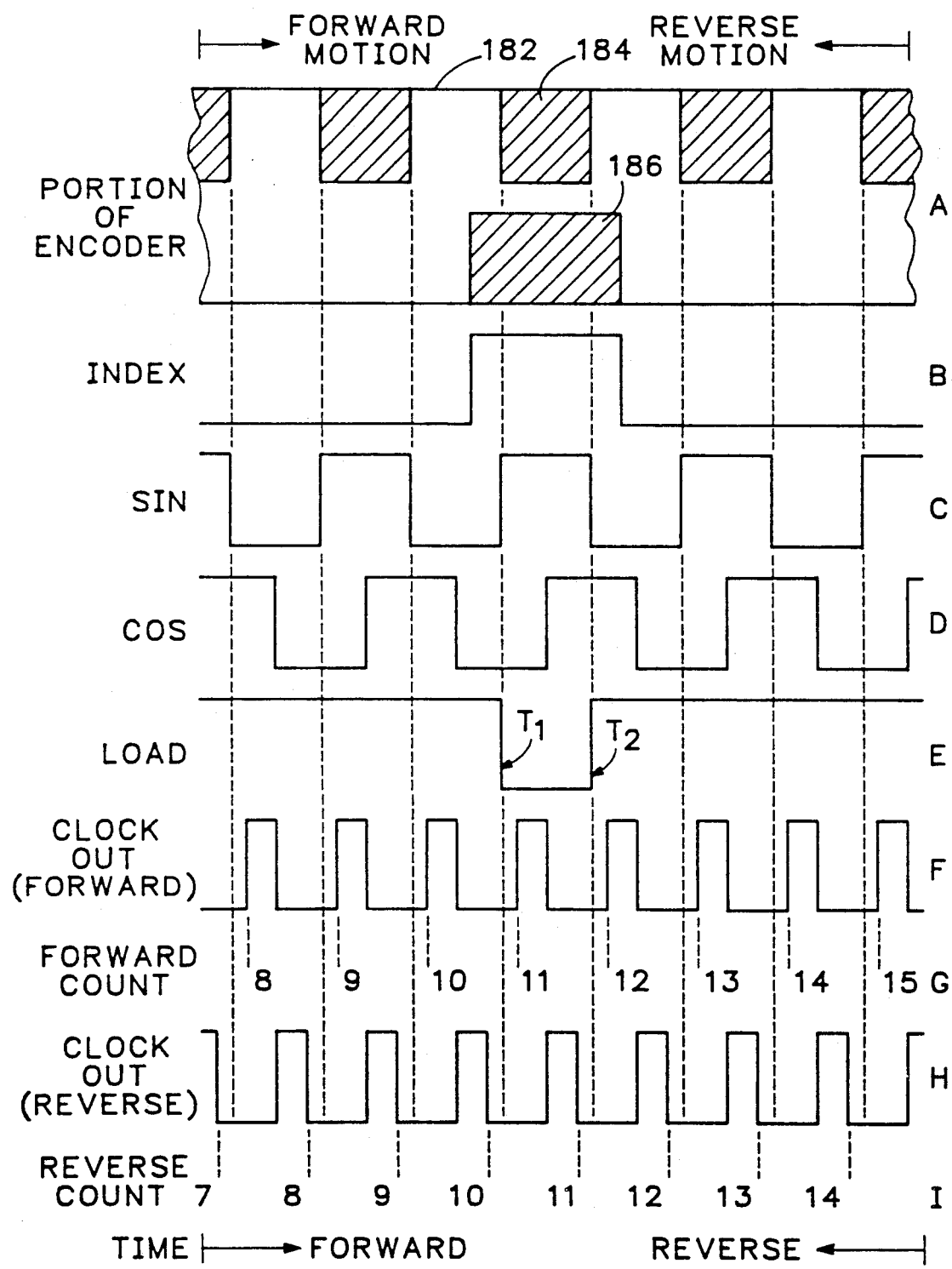
FIG. 13 is a timing diagram associated with the encoder of FIG. 12.

FIG. 13A shows a magnified portion of position encoder strip 182, including exemplary markers 184 and index marker 186. FIGS. 13B-13I show some key timing signals.

As mentioned, markers 184 are used to generate the sine and cosine signals. The lines on the diagram labeled "INDEX" (FIG. 13B), "SIN" (FIG. 13C), and "COS" (FIG. 13D) are the outputs from detector/preamplifier assembly 188. Note that the "SIN" output is exactly in phase with markers 184, while the "COS" output is 90° out of phase with it. In this system, a clock is generated by the quadrature encoder logic circuit 200 at each edge of the "SIN" signal. These clocks are shown as "CLOCK OUT" (FIGS. 13F and 13H) on the diagram. The signal labeled "LOAD" (FIG. 13E) is the output of NAND-gate 196, which goes to counter 198. Note also that the clocks going to the counter are actually delayed slightly, in order to allow the "direction" and "load" signal changes (if any) to reach the counter first.

Shown below the "CLOCK OUT (FORWARD)" and "CLOCK OUT (REVERSE)" signals are typical counting sequences for the forward direction (FIG. 13G) and reverse direction (FIG. 13I), respectively, around the index marker. For purposes of illustration, assume that the counter is to be preset to the value of 11 at the index marker. Moving in the forward direction, the counter advances by one shortly after each rising edge of the clock signal. The value in the counter will advance as shown from 8 to 9 and to 10. A point in time marked "$T_1$", the output of the NAND gate goes low, enabling a preset of the counter on the clock edge which follows an instant later. Since the value that was to be preset was 11, the counter advances to 11 and the fact that this number was actually preset rather than counted to is not apparent. At the point marked "$T_2$", the "LOAD" signal goes high just before the clock, allowing the counter to advance to 12. Counting proceeds until at some higher number the motion reverses. At each transition of the "SIN" signal, during reverse motion, the value in the counter decreases by one.

It can be seen that, for each clock transition associated with a selected marker, the value of the counter is one less when counting down than when counting up. The reason for this can easily be seen by considering what happens the instant the motion reverses. Suppose that the direction change occurred just after the value of 15 was reached. Now, when the encoder moves back down, the edge which caused the 14 to 15 transition causes a 15 to 14 transition. Thus, the point on the encoder at which the counter advances to 15 when moving forward is the same one at which it changes to 14 when moving backward.

At the point in time marked "$T_2$" on the diagram, while counting down, the "LOAD" signal again goes low just before the rising edge of the clock signal, causing the value of 11 to be again loaded into the counter. As before, this preset operation is not apparent as long as no cumulative error has occurred. Note that an error would have occurred if the NAND gate had not been included, allowing loading at point "$T_1$" instead.

An alternative embodiment of the generation of the "load" signal for the counter is shown in dashed lines in FIG. 12. In this embodiment, an AND gate 202 is located between NAND gate 196 and the load port of the counter. The AND gate receives the output of gate 196 as well as the direction signal from quadrature encoder 200. This allows the presetting of the counter to only take place during the reverse direction pass of the carriage, and inhibits it during the forward pass, which may be desirable in some circumstances.

It will be seen that this encoder provides incremental counting with an absolute position reference that is rechecked every time the encoder passes the center (or other equivalent point) of travel, and that positive only position values are generated for any position within the range of the carriage. Such a position referencing scheme eliminates the need for the counter to ever reach a value of zero.

While the invention has been described with reference to the foregoing preferred methods and embodiments, it will be apparent to those skilled in the art that variations may be made without varying from the spirit and scope of the invention as defined in the claims.

We claim:

1. An apparatus for tracking the position of a first element moveable relative to a second element back and forth along a path having a predetermined maximum length comprising:
    means defining a plurality of positions of the first element along the path;
    means defining a predetermined position intermediate the ends of the path;
    first means responsive to the means defining a plurality of positions for generating a first signal indicative of movement of the first element relative to the second element;
    second means responsive to the predetermined position defining means for generating a second signal indicative of movement of the first element past the predetermined position relative to the second element;
    counter means responsive to the first signal for counting up and down, corresponding to the direction of travel of the first element relative to the second element; and
    means responsive to the second signal for resetting the counter means to a predetermined value greater than zero when the first element travels past the predetermined position relative to the second element.

2. An apparatus according to claim 1 wherein the means defining an intermediate position defines a central position on the path.

3. An apparatus according to claim 1 wherein the predetermined value is sufficiently positive that the counter value is positive for all positions along the path.

4. An apparatus according to claim 1 further comprising means for limiting resetting the counter means to resetting during only one direction of travel of the first element relative to the second element.

5. An apparatus according to claim 4 wherein the limiting means further comprises means for generating a third signal indicative of the direction of travel of the first element relative to the second element and gate means responsive to the second signal and to the third signal for passing the second signal to the counter means when the third signal indicates travel of the first element relative to the second element in a predetermined direction.

6. An apparatus according to claim 5 wherein the predetermined value is sufficiently positive that the counter value is positive for all positions along the path.

7. An apparatus according to claim 6 wherein the means defining an intermediate position defines a central position on the path.

* * * * *